Fig. 1.

INVENTORS
Donald F. MacNaught
and Robert A. Jacobson
BY R. S. A. Hougherty.
ATTORNEY

INVENTORS
Donald F. MacNaught
and Robert A. Jacobson
BY R.S.A. Hlougherty.
ATTORNEY Aug. 15, 1961  D. F. MacNAUGHT ET AL  2,996,032
FOLDING HATCH COVERS
Filed March 2, 1955  10 Sheets-Sheet 9

INVENTORS
Donald F. MacNaught
and Robert A. Jacobson
BY R.S.A. Dougherty.
ATTORNEY

INVENTORS
*Donald F. MacNaught*
and *Robert A. Jacobson*
BY *R. S. A. Dougherty.*
ATTORNEY

United States Patent Office 2,996,032
Patented Aug. 15, 1961

2,996,032
FOLDING HATCH COVERS
Donald Frederick MacNaught, Hingham, and Robert Allan Jacobson, North Abington, Mass., assignors to Bethlehem Steel Company, a corporation of Pennsylvania
Filed Mar. 2, 1955, Ser. No. 491,632
10 Claims. (Cl. 114—202)

This invention relates to an improved hatch cover for cargo-carrying ships, which can be operated so as to quickly close and tightly seal hatch openings, and which also can be quickly unsealed and opened.

Cargo-carrying ships are generally constructed with a top deck, called the "weather" deck, situated above several cargo-carrying decks, known as "tween" decks. The weather deck is provided with several hatch openings through which the cargo can be raised or lowered by suitable power-operated means. The hatch openings are open only when the ship is in port and cargo is being loaded or unloaded. At other times, the hatch openings are kept closed and sealed. The custom formerly had been to place beams across the hatch opening and to cover these beams with planks, tarpaulin, or other suitable material. This method required considerable time and labor, and, on a large ship, several hours might have been required to close a single hatch opening. The maintenance of a large, modern vessel in port is very costly. Therefore, methods reducing the time required to open or close a hatch opening, thus reducing the time required to load or unload a ship, are very significant from an economic point of view.

The improved hatch cover forming the subject of this invention comprises two section, each covering half of the hatch opening. Each section comprises two panels, one of which panels is hinged at one side to the transverse edge or coaming of the hatch opening, and at the opposite side is hinged to the second panel. The unhinged side of the second panel is provided with wheels rolling on tracks mounted alongside the longitudinal edges or coaming of the hatch opening, and meets its counterpart of the other section at the center of the hatch opening when the hatch cover is closed. Gaskets are mounted to the several panels of the hatch cover. Those lengths of gasket that are seated adjacent to the hatch coaming are compressed by quick-acting dogging means to seal the hatch opening.

One object of this invention is to provide a hatch cover which may be fully opened or closed in a few minutes, and which, when open, will occupy a minimum of deck space at the hatch ends.

Another object of this invention is to provide means which can be rapidly operated so as to tightly seal the hatch opening.

A further object of this invention is to provide a hatch cover so designed that one section may be opened or closed independently of the other section.

A still further object of this invention lies in the means for insuring a watertight seal between the two sections of the hatch cover, when said two sections are unequally loaded.

Another object of this invention relates to the means for lowering the wheels carrying the unhinged ends of each hatch cover section, prior to dogging down, so that full gasket compression can be realized and the wheels may thereby be relieved of load when the cover is closed.

Other objects and advantages of our invention will be apparent during the course of the following description which illustrates the best embodiment of the invention, although said invention is capable of embodiment in many different forms. The illustrated embodiment is, therefore, to be regarded only as typical, and the invention is not to be confined thereto.

In the accompanying drawings.

Referring now to the drawings, in which like numerals indicate like parts in the several views, there is shown, for the purpose of illustration, hatch cover 1, constructed in accordance with the present invention, fastened over hatch opening 2 by dogging means 3.

Hatch cover 1 (FIGURE 1), covering hatch opening 2, comprises two independently operated sections 4 and 5 which, when fully extended so as to close hatch opening 2, meet at parting joint 6. Section 4 comprises panels 7 and 8. Section 5 comprises panels 9 and 10. Panels 7 and 10, the exterior panels, are each hinged at the hatch end 11 to deck 12 by main hinges 13. Panel 8, an interior panel, is hinged to panel 7 at intermediate joint 14 by intermediate hinges 15. In like manner, panel 9, the other interior panel, is hinged to panel 10 at intermediate joint 14 by intermediate hinges 15.

Figure 2A:
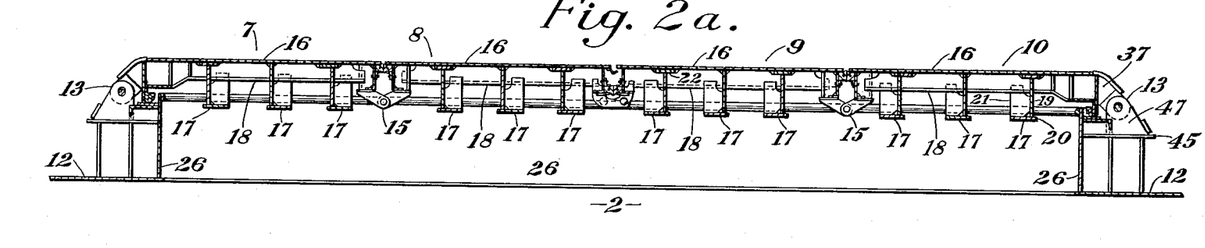
FIGURE 2a represents a section in elevation of the fully closed hatch cover, taken along the line 2—2 of FIGURE 1.
Figure 3:
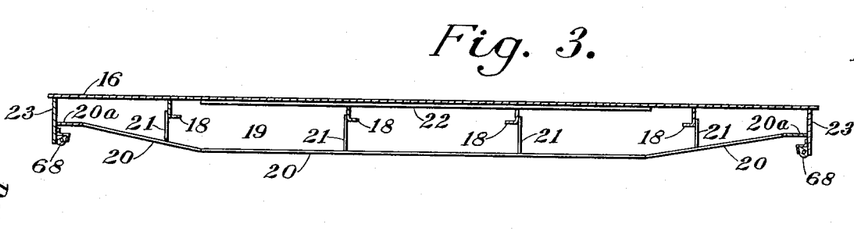
FIGURE 3 represents a section in elevation of the hatch cover, taken along the line 3—3 of FIGURE 1, showing a girder.
Figure 4:
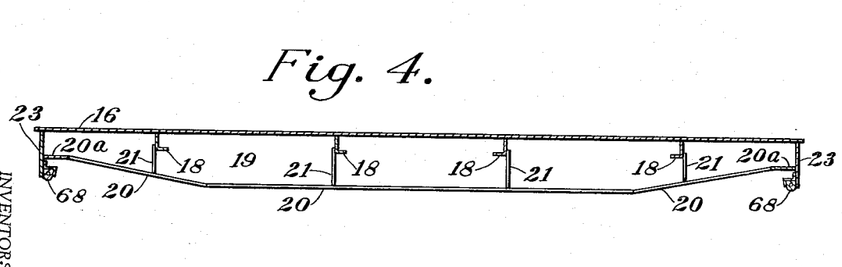
FIGURE 4 represents a section in elevation of the hatch cover, taken along the line 4—4 of FIGURE 1, showing another girder.

Panels 7, 8, 9 and 10 (FIGURE 2a) are constructed of cover plates 16 stiffened by spaced girders 17 and by spaced structural angles 18. Girder 17 (FIGURE 4) is built up of web plate 19 to which bottom flange plates 20 and longitudinal plates 20a have been fastened, as by welding. At spaced intervals along the length of girder 17 are located chocks 21 which serve to stiffen web plate 19, and which are fastened as by welding, to web plate 19, bottom flange plate 20 and angle 18. Girder 17 is, basically, a simply-supported member, requiring a section modulus greater in the center than at the ends thereof. In accordance with sound engineering practice, therefore, the depth of girder 17 is greatest along the central portion thereof. Extending along the major portion of the length of girder 17, and fastened, as by welding, to the top of web plate 19, is top flange plate 22 (FIGURE 3). The loading on the girders adjacent to the sides of the panels requires that the top flange plate be fitted to these girders at each of the respective panels 7, 8, 9 and 10, as has been shown in the drawings.

Figure 2B:
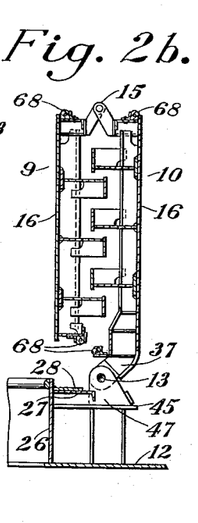
FIGURE 2b represents a section in elevation of the fully opened hatch cover, taken along the line 2—2 of FIGURE 1.

Web plate 19 is notched in depth, along that part of its length which supports top flange plate 22, by an amount equal to the thickness of top flange plate 22. Side plates 23 cover the longitudinal sides of panels 7, 8, 9 and 10. Structural angles 24 cover both of the transverse sides of each of panels 8 and 9 and also cover those transverse sides of panels 7 and 10 that face intermediate joints 14. The transverse sides of panels 7 and 10 facing main joints 11 are covered by end plates 25. Cover plates 16 project beyond the sides of panels 7, 8, 9 and 10, as defined by said side plates 23, angles 24 and end plates 25. Side plates 23 project beyond those transverse sides, as defined by angles 24, of panels 7, 8, 9 and 10 joining intermediate joint 14 and parting joint 6. Girders 17 of the several panels 7, 8, 9 and 10 are so spaced that when panels 7 and 8, and 9 and 10 are rotated about their respective intermediate joints 14, girders 17 of panels 7 and 10 will nest in the bays between girders 17 of panels 8 and 9 (FIGURE 2b). In this manner, when hatch cover 1 is open, and sections 4 and 5 are folded about their respective intermediate joints 14 thus exposing hatch opening 2, panels 7 and 10 will be parallel to their respective adjacent panels 8 and 9, and folded sections 4 and 5 will therefore occupy a minimum of deck space.

Hatch coaming 26, placed around the perimeter of hatch opening 2, extends upwardly from deck 12. Along the exterior of hatch coaming 26, and below the top thereof, is fastened coaming channel 27. Gasket seat plates 28 are fastened to the top of those lengths of coaming channel 27 running parallel to the hatch ends 11. Rider plates 29 are fastened to the top of those lengths of coaming channel 27 running perpendicular to hatch ends 11. The tops of the four sections of hatch coaming 26 are at a uniform level. The tops of gasket seat plates 28 and of rider plates 29 are at a uniform level.

Figure 8:
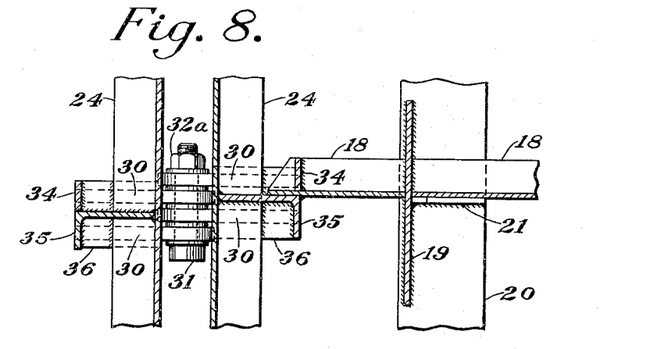
FIGURE 8 represents a section in plan of the intermediate hinge, taken along the line 8—8 of FIGURE 5.

Intermediate hinge 15 (FIGURE 5) comprises four hinge blades 30 pivoted on hinge pin 31, spaced by washers 32, and held by nut 32a. Chock 33 stiffens angle 18. Hinge seat 34 and chock 35, fastened as by welding to panel 7, 8, 9 or 10, as shown in the drawings (FIGURES 6 and 8), support base plate 36 to which alternate hinge blades 30 have been fastened.

Figure 9:
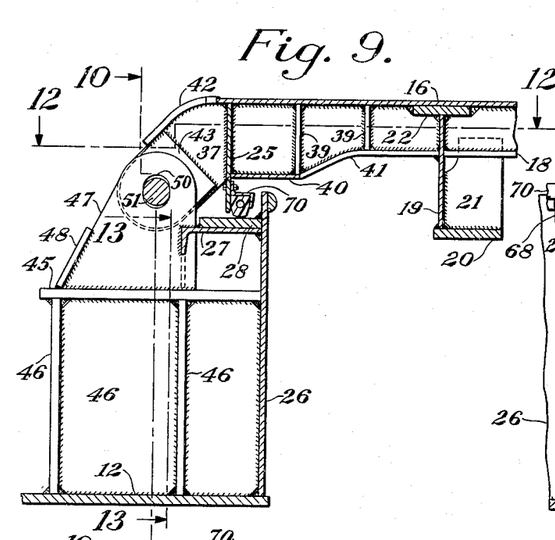
FIGURE 9 represents a view in elevation of the main hinge.
Figure 10:
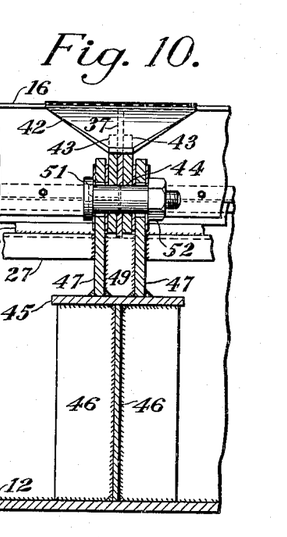
FIGURE 10 represents a section in elevation of the main hinge, taken along the line 10—10 of FIGURE 9.
Figure 11:
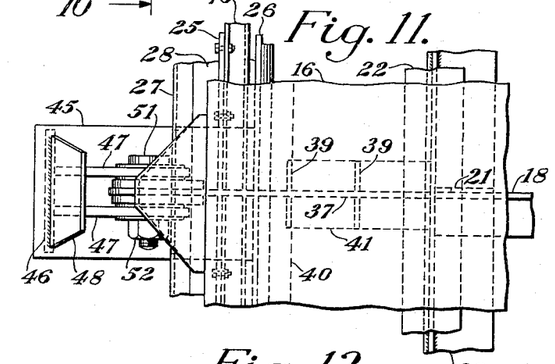
FIGURE 11 represents a view in plan of the main hinge.
Figure 12:
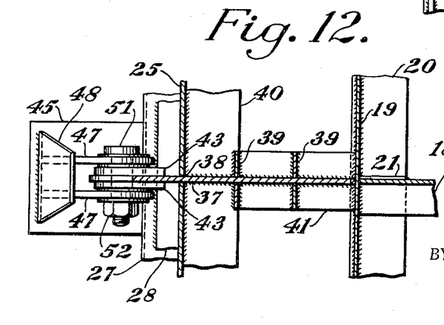
FIGURE 12 represents a section in plan of the main hinge, taken along the line 12—12 of FIGURE 9.
Figure 13:
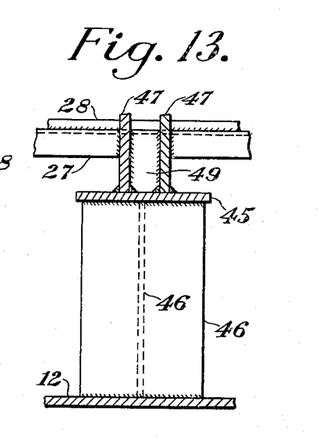
FIGURE 13 represents another section in elevation of the main hinge, taken along the line 13—13 of FIGURE 9.

Main hinge 13 (FIGURE 9) comprises hinge blade 37, passing through slot 38 in end plate 25, and fastened, as by welding, to web plate 19 of that girder 17 nearest hatch end 11. Chocks 39 and plates 40 and 41 rigidly brace hinge blade 37 to panel 7 or 10. Plate 42 stiffens that part of hinge blade 37 extending out from panel 7 or 10. Pads 43, one on each side of hinge blade 37, stiffen said hinge blade 37 at the outermost portion thereof. Hole 44 is formed through pads 43 and hinge blade 37. Main hinge support plate 45 is fastened to hatch coaming 26 and is rigidly braced to main deck 12 by chocks 46. Brackets 47 extend upwardly from main hinge support plate 45 and are spaced apart to accommodate the thickness of pads 43 and hinge blade 37. Plate 48 braces brackets 47 to each other. Coaming channel 27 is slotted in way of brackets 47. Plate 49 is fastened between brackets 47 in slot in coaming channel 27. Slot 50 is formed through brackets 47. The horizontal dimension of slot 50 is equal to the diameter of hole 44. The vertical dimension of slot 50 is larger than the diameter of hole 44 by an amount equal to the desired gasket compression plus a small allowance for miscellaneous clearances. Hinge pin 51 extends through brackets 47, pads 43 and hinge blade 37, and is held by nut 52, thus mounting hinge blade 37 to permit rotation and limited vertical movement thereof.

Recessed transversely centered lifting means (FIGURE 14) are provided in panels 7 and 10 to accommodate a line 54 from a cargo whip or other suitable hoist means, for controlled opening and closing of sections 4 and 5 of hatch cover 1. Cover plate 16 is formed with opening 55. Plates 56 are arranged along the sides of opening 55, extending downwardly therefrom, and are fastened, as by welding, to the cover plate 16 at the sides of opening 55, to angle 24, and to web plate 19 of girder 17 nearest intermediate joint 14. Plates 56 are braced by cocks 56a and plates 56b. Plates 57 are fastened between plates 56. It can be seen that plates 56 form the sides of recessed opening 58, and plates 57 form the bottom and ends of said recessed opening 58. Thus, recessed opening 58 is isolated from hatch opening 2. Lifting pad 59, with eye 60, is fastened, as by welding, to sleeve 61 with hole 62 therein receiving bushings 63. Pin 64 is passed through holes 65 formed in plates 56, and through bushings 63, and is held by nut 66, thus rotatably mounting sleeve 61 and lifting pad 59. Angles 67 are fastened to web plates 19 thus stiffening panels 7 and 10 in the region of the lifting means. When the lifting means is not in use, lifting pad 59 rests on plate 57 at the bottom of recessed opening 58, and thus does not obstruct the surface of panels 7 and 10. When it is desired to utilize the lifting means, lifting pad 59 is rotated around pin 64 until eye 60 is exposed above cover plate 16, at which point line 54 from the cargo whip is fastened thereto.

Panels 7, 8, 9, and 10 are each provided with gasket 68, preferably made of neoprene polymer, and serving as a watertight seal for each of said panels 7, 8, 9 and 10.

Figure 1:
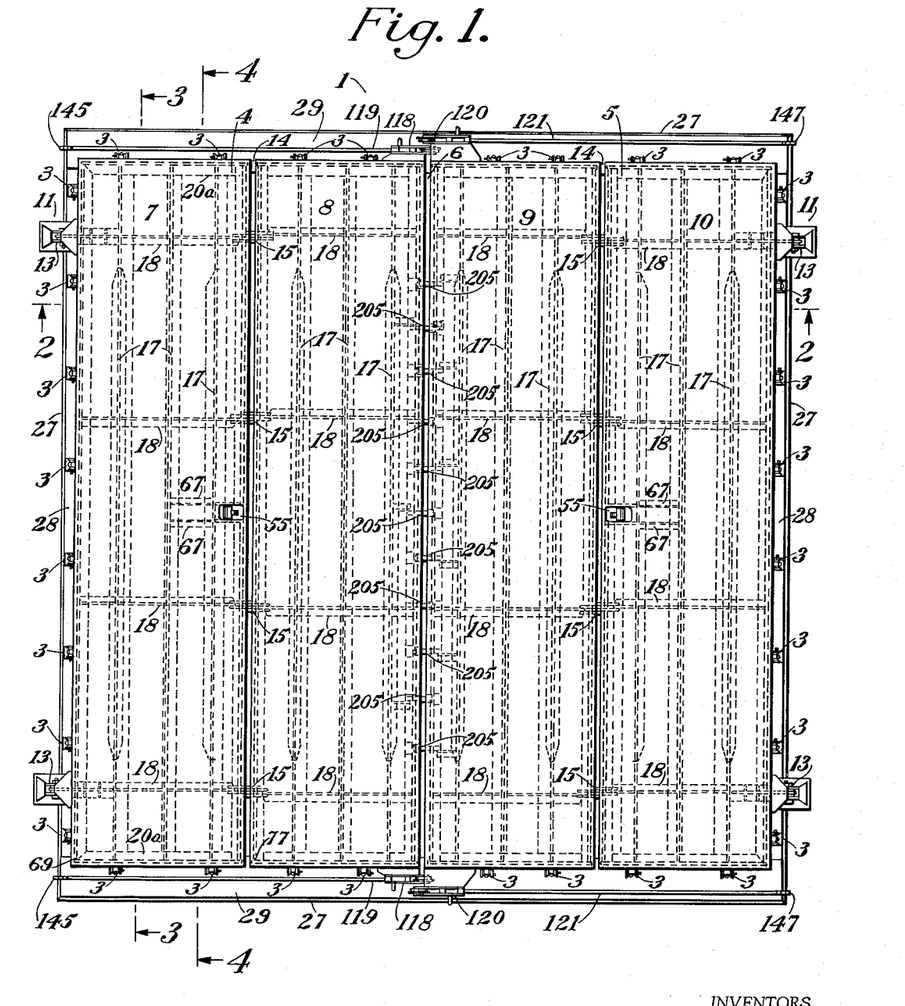
FIGURE 1 represents a view in plan of the hatch cover as it appears when fully closed.
Figure 19:
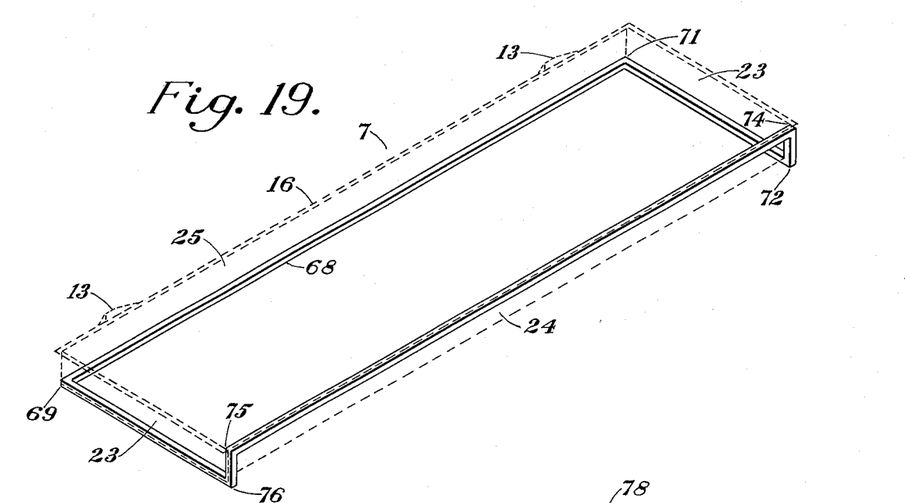
FIGURE 19 represents an isometric view of the gasket arrangement on an exterior panel of the hatch cover.

Considering panel 7, and starting from point 69 on FIGURE 1, for the purpose of illustration, it can be seen (FIGURE 19) that gasket 68 runs along the inside of end plate 25, held thereto by gasket retainer 70, until point 71, where gasket 68 makes a 90° change in direction to the right. Gasket 68 runs from point 71 to point 72, at the same level as from point 69 to point 71, along the inside of side plate 23, held thereto by gasket retainer 70. At point 72, gasket 68 makes as 90° change in direction, rising upwardly, running along the inside of side plate 23, held thereto by gasket retainer 73, until point 74 is reached. At point 74, gasket 68 makes a 90° change in direction, reverting to the horizontal plane, running along the bottom of cover plate 16, held thereto by gasket retainer 73, until point 75 is reached. At point 75, gasket 68 makes a 90° change in direction, running downwardly along the inside of side plate 23, held thereto by gasket retainer 73, until point 76 is reached. At point 76, gasket 68 makes a 90° change in direction, reverting to the same horizontal plane as defined by points 69, 71 and 72, and running along the inside of side plate 23, held thereto by gasket retainer 70, until starting point 69 is reached.

The gasket on panel 10 is similar to that on panel 7.

Figure 20:
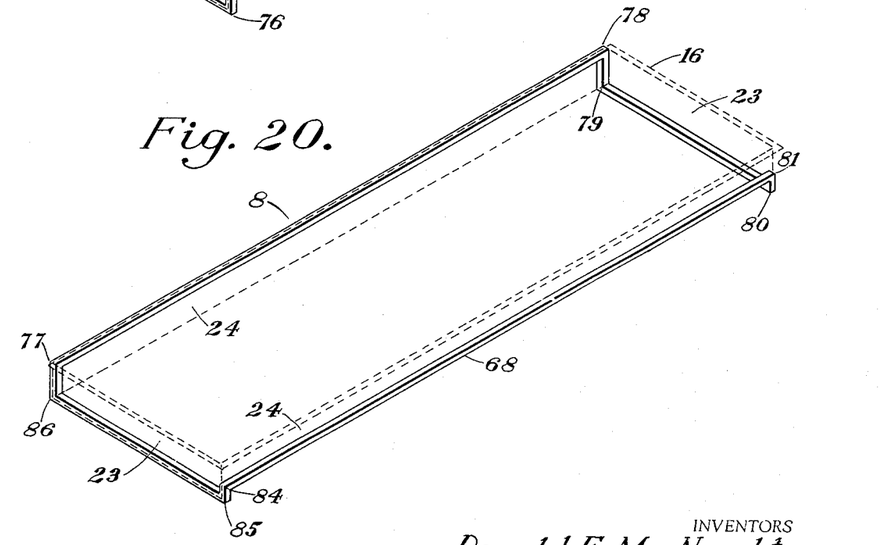
FIGURE 20 represents an isometric view of the gasket arrangement on an interior panel of the hatch cover.

Considering panel 8, and starting from point 77 on FIGURE 1, for the purpose of illustration, it can be seen (FIGURE 20) that gasket 68 runs along the bottom of cover plate 16, held thereto by gasket retainer 73, until point 78 is reached. At point 78, gasket 68 makes a 90° change in direction, running downwardly along the inside of side plate 23, held thereto by gasket retainer 73, until point 79 is reached. At point 79, gasket 68 makes a 90° change in direction, running in a horizontal plane along the inside of side plate 23, held thereto by gasket retainer 70, until point 80 is reached. At point 80, gasket 68 makes a 90° change in direction, running upwardly along the inside of side plate 23, held thereto by gasket retainer 70, until point 81 is reached. At point 81, gasket 68 makes a 90° change in direction, running in a horizontal plane along the lower extremity of the vertical leg of angle 24, held thereto by gasket retainer 82 and bar 83, until point 84 is reached. At point 84, gasket 68 makes a 90° change in direction, running downwardly along the inside of side plate 23, held thereto by gasket retainer 70, until point 85 is reached. At point 85, gasket 68 makes a 90° change in direction, running in the same horizontal plane as points 79 and 80, along the inside of side plate 23, held thereto by gasket retainer 70, until point 86 is reached. At point 86, gasket 68 makes a 90° change in direction, running upwardly along the inside of side plate 23, held thereto by gasket retainer 73, until starting point 77 is reached.

The gasket on panel 9 is similar to that on panel 8.

Figure 23:
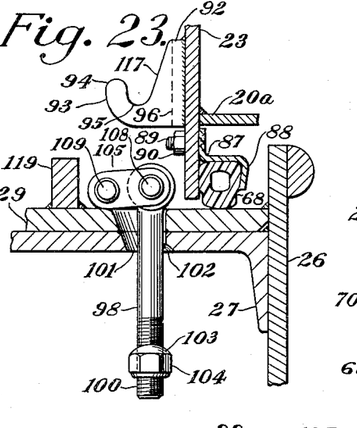
FIGURE 23 represents still another view of the dogging means, as it appears when the hatch cover is undogged, showing the dog bolt suspended from the coaming channel and rider plate by the dog link.
Figure 24:
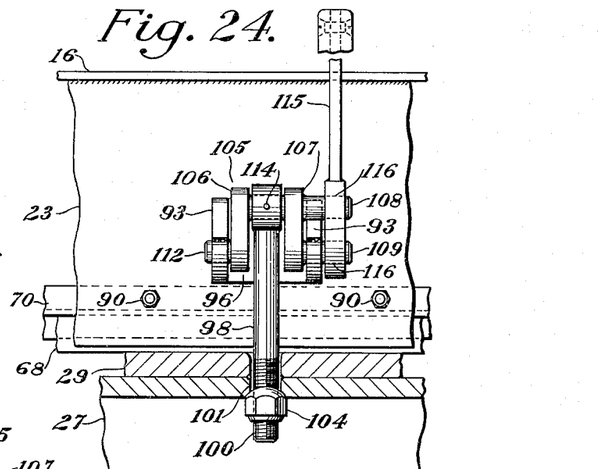
FIGURE 24 represents a section in elevation of the dogging means, taken along the line 24—24 of FIGURE 22.
Figure 25:
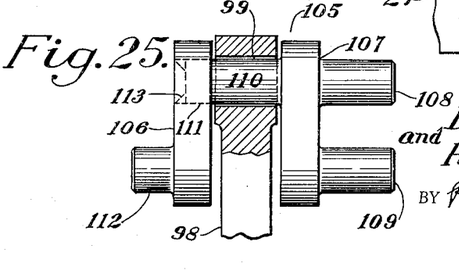
FIGURE 25 represents a detail of the manner of assembly of the dog bolt and dog link.

Gasket retainer 70 has two bends (FIGURE 23). Upper bend 87 defines a right angle. Lower bend 88 defines a slightly acute angle. When gasket 68 is mounted to end plate 25 or side plate 23, the acutely-bent leg of lower bend 88 of gasket retainer 70 holds gasket 68 in place in a positive manner, by a pinching action.

Figure 5:
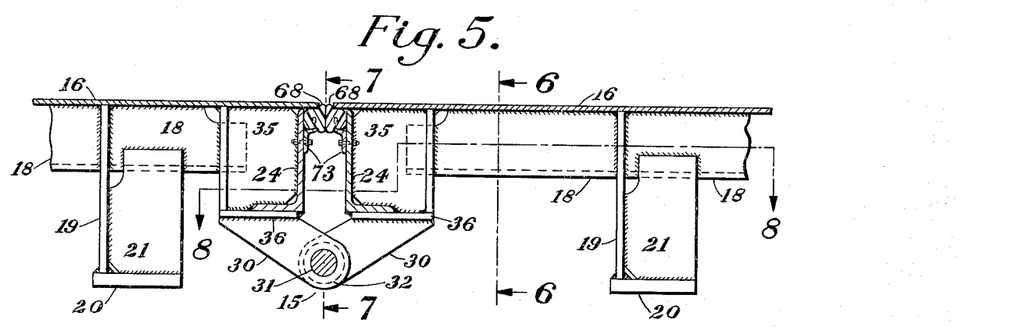
FIGURE 5 represents a view in elevation of the intermediate hinge.
Figure 6:
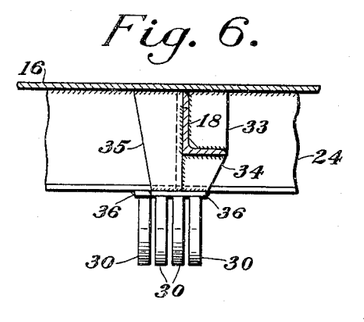
FIGURE 6 represents a section in elevation of the intermediate hinge, taken along the line 6—6 of FIGURE 5.
Figure 7:
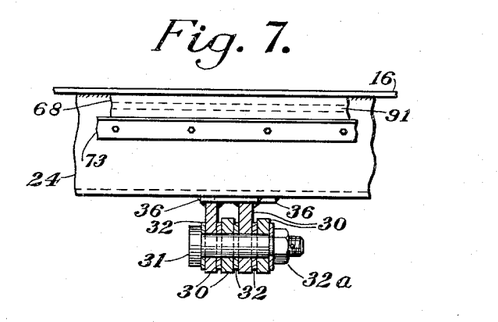
FIGURE 7 represents another section in elevation of the intermediate hinge, taken along the line 7—7 of FIGURE 5.

Gasket retainer 73 defines a slightly obtuse angle (FIGURE 5). When gasket 68 is mounted to the bottom of cover plate 16, or to side plate 23, gasket retainer 73 holds said gasket 68 in place in a positive manner, by a pinching action.

Figures 14, 15, 16, 17, 18:
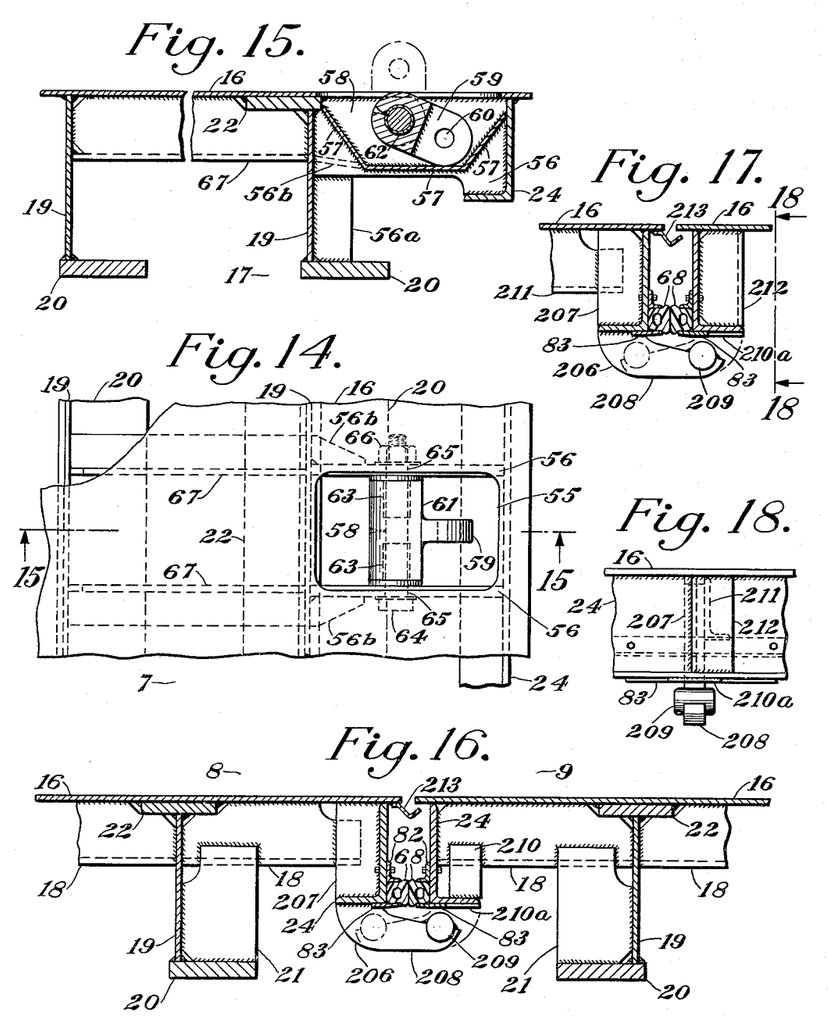
FIGURE 14 represents a view in plan of the hatch cover lifting means.
FIGURE 15 represents a section in elevation of the hatch cover lifting means, taken along the line 15—15 of FIGURE 14.
FIGURE 16 represents a view in elevation of the support chocks.
FIGURE 17 represents another view in elevation of the support chocks.
FIGURE 18 represents a section in elevation of the support chock, taken along the line 18—18 of FIGURE 17.

Gasket retainer 82 defines a right angle. Bar 83 is bent slightly (FIGURE 16). When gasket 68 is mounted to the vertical leg of angle 24, bar 83 holds said gasket 68 in place against gasket retainer 82 in a positive manner, by a pinching action.

Bar 83 is fastened to angle 24, preferably in a permanent manner, as by welding. Gasket retainers 70, 73 and 82 are removably fastened to the various parts of the several panels, as by spaced bolts 89 and nuts 90. In this manner, gasket 68 can quickly be replaced when its useful life is over.

If desired, gasket 68 can also be cemented to the various parts of the panels in contact therewith.

At intermediate joints 14 and parting joint 6, cover plates 16 and side plates 23 project the same distance beyond the sides of the several panels as defined by angle 24. Gasket 68 must project beyond the edges of cover plates 16 and side plates 23 at said intermediate joints 14 and parting joint 6 by an amount equal to the desired gasket compression plus an allowance for miscellaneous clearances. Preferably the gasket compression is ¼", and the clearance allowance is ⅜", making a total of ⅝".

Gasket 68 is formed with hole 91 to insure proper compression when hatch cover 1 is fully extended and dogged down by dogging means 3.

It should be noted, at this point, that intermediate hinges 15 lie at the bottom of intermediate joint 14. Consequently, as sections 4 and 5 are extended so as to close hatch opening 1, the greatest relative movement between panels 7 and 8, and 9 and 10, occurs at the top of intermediate joint 14. It is for this reason that gasket 68 is placed at the top of said intermediate joint 14, thus insuring proper compression and a watertight seal when sections 4 and 5 are extended.

Furthermore, as sections 4 and 5 are extended to meet at parting joint 6, the greatest relative movement between panels 8 and 9 occurs at the top of parting joint 6. Therefore, to prevent overcompression in the gasket and to insure proper final gasket compression and a watertight seal, gasket 68 is run along the bottom of parting joint 6.

Figure 21:
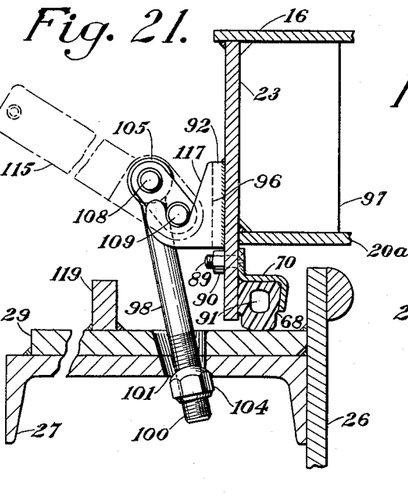
FIGURE 21 represents a view in elevation of the dogging means, showing the dog link as it is brought over the arms of the dog pad.

Dogging means 3 (FIGURE 21) are spaced around the perimeter of hatch opening 2. Dog pad 92, with arms 93 forming shoulders 94, recesses 95 and slot 96, is fastened, as by welding, to the exterior of side plates 23 and end plates 25. Chock 97 is fastened, as by welding, to cover plate 16, and side plate 23 or end plate 25 at each location of dog pad 92 except where the dog pads 92 are backed up with girders 17. Dog bolt 98, having eye 99 at the upper end, and threaded at the lower end, as at 100, is situated in slot 101. Slot 101, formed through coaming channel 27 and gasket seat plate 28 or rider plate 29, is trapezoidal in cross-section so as to permit rotation of dog bolt 98 in a plane perpendicular to hatch coaming 26. In addition, a concave bearing surface 102 is formed at the bottom of slot 101, and matches the convex bearing surface 103 of dog nut 104 which is threaded on dog bolt 98. Dog link 105 comprises female link 106 and male link 107. Male link 107 is formed with upper lever pin 108 and lower lever pin 109, both pins extending from one face of male link 107, and one bolt pin 110 extending from the opposite face thereof, and in axial alignment with the upper lever pin 108. Female link 106 is formed with eye 111 and pin 112. To assemble dog link 105, bolt pin 110 of male link 107 is passed through eye 99 of dog bolt 98 thus rotatably mounting said dog bolt 98, and is inserted into eye 111 of female link 106 from that face of female link 106 opposite pin 112. The center-to-center distance between upper lever pin 108 and lower lever pin 109 on male link 107 is equal to the center-to-center distance between eye 111 and pin 112 on female link 106. Therefore, after bolt pin 110 is inserted in eye 111, female link 106 can be rotated until pin 112 is in axial alignment with lower lever pin 109. At this point, female link 106 can be permanently fastened to male link 107 by welding as at 113. It is very important that pin 112 be exactly aligned with lower lever pin 109 before the welding is done, as the dogging means 3 will not work efficiently otherwise. Hole 114 for a grease fitting is drilled radially to eye 99 of dog bolt 98 to permit proper lubrication. When hatch opening 2 is uncovered, and dogging means 3 is not in use, dog bolt 98 is suspended through slot 101 in gasket seat plate 28 or rider plate 29 by dog link 105 (FIGURE 23).

Figure 22:
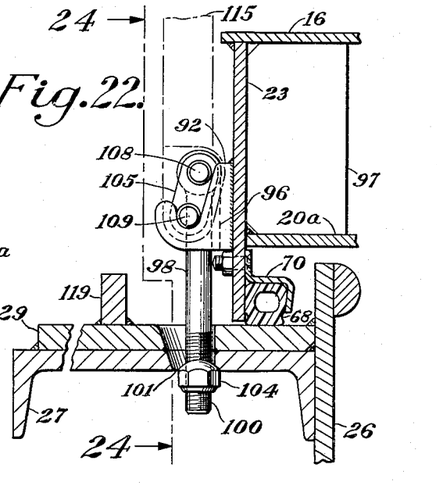
FIGURE 22 represents another view in elevation of the dogging means, showing the dog link locked in position against the arms of the dog pad, with the gasket fully compressed.

When it is desired to actuate dogging means 3, dog lever 115, formed with eyes 116 having a center-to-center distance equal to the center-to-center distance between upper lever pin 108 and lower lever pin 109 is employed. Upper lever pin 108 and lower lever pin 109 are of sufficient length to accommodate the thickness of one arm 93 of dog pad 92 and the thickness of dog lever 115. Arms 93 of dog pad 92 are spaced sufficiently to accommodate female link 106, male link 107, and dog bolt 98 in slot 96. The use of dog lever 115 is as follows: First, dog lever 115 is fastened to dog link 105 by inserting upper lever pin 108 and lower lever pin 109 into eyes 116 of dog lever 115. Secondly, dog bolt 98 is lifted from its suspended position by dog lever 115, and pin 112 and lower lever pin 109 of dog link 105 are brought over shoulders 94 of dog pad 92 and dropped into recesses 95 formed by arms 93 of said dog pad 92. Thirdly, the end of dog lever 115 is pulled up, forcing the convex bearing surface 103 of dog nut 104 against the concave bearing surface 102 of slot 101, thus exerting a downward force on dog pad 92 and compressing gasket 68 against gasket seat plate 28, or rider plate 29. The line joining the centers of eyes 116 of dog lever 115 is at an angle with the longitudinal axis of dog lever 115. Preferably, this angle is equal to the angle defined by the back of slot 96 and the line joining the centers of upper lever pin 108 and lower lever pin 109, said angles being calculated for the condition in which the upper end of dog bolt 98 is in contact with the back of said slot 96. Arms 93 of dog pad 92 are sloped as at 117. It will be noted that dog lever 115 is so mounted to dog link 105 that the line joining the centers of eyes 116 therein lies between the longitudinal axis of dog lever 115 and hatch opening 2. The reason for this will now appear. As dog lever 115 is pulled up, it approaches a position parallel to hatch coaming 26. At this point, dog bolt 98 is locked into position against the back of slot 96 (FIGURE 22) and dog lever 115 can now be removed from upper lever pin 108 and lower lever pin 109 of dog link 105.

When it is desired to undog hatch cover 1, the above process is simply reversed.

The face of gasket 68 extends beyond the bottom of side plate 23 or coaming plate 25 by an amount equal to the desired gasket compression plus a small allowance for clearance of lower lever pin 109 and pin 112 over shoulders 94 of arms 93 of dog pad 92. Preferably, the gasket compression is ¼", and the clearance allowance is ⅛". Therefore, the face of the gasket 68 should extend ⅜" beyond the bottom of side plate 23 or coaming plate 25. The clearance between the bottom of recesses 95 and lower lever pin 109 and pin 112 can also be adjusted by advancing or retracting dog nut 104 on dog bolt 98.

Wheel assembly 118 (FIGURE 27) is mounted to each longitudinal side of panel 8, near parting joint 6, and rides on rail 119. Wheel assembly 120 is mounted to each transverse side of panel 9, near parting joint 6, and rides on rail 121, outboard of wheel assembly 118 and rail 119.

Figures 28, 29:
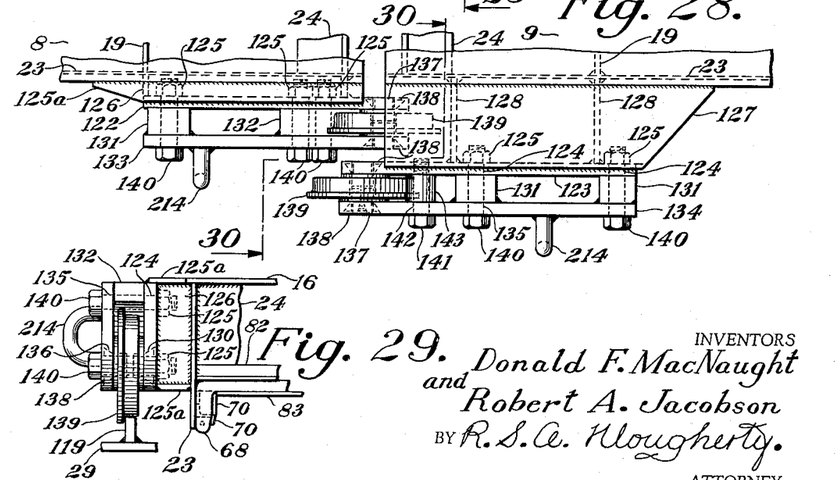
FIGURE 28 represents a view in plan of the wheel assemblies.
FIGURE 29 represents a section in elevation of the inboard wheel assembly, taken along the line 29—29 of FIGURE 27.

Inner wheel brackets 122 and 123, of wheel assemblies 118 and 120 respectively, are formed with holes 124. Nuts 125, aligned with holes 124, are tack welded to the inboard faces of inner wheel brackets 122 and 123. Inner wheel bracket 122 is fastened, as by welding, by means of plates 125a and chocks 126, to side plate 23 of panel 8. Similarly, inner wheel bracket 123 is fastened, as by welding, by means of plates 127 and chocks 128, to side plate 23 of panel 9. Projections 129 of inner wheel brackets 122 and 123 extend beyond the faces of their respective panels 8 and 9, and are formed with countersunk holes 130, as shown in the drawings. Spacing blocks 131 and 132 are fastened, as by welding, to outer wheel bracket 133 of wheel assembly 118 and outer wheel bracket of wheel assembly 120. Outer wheel brackets 133 and 134 are of the same shape and proportions as their respective inner wheel brackets 122 and 123, and are formed with holes 135 registering with holes 124 of their respective inner wheel brackets 122 and 123, said holes 135 also passing through spacing blocks 131 and 132, and with countersunk holes 136 registering with hole 130 of their respective inner wheel brackets 122 and 123. To assemble wheel assemblies 118 and 120, wheel pins 137 are first inserted through holes 130 of inner wheel brackets 122 and 123, and are securely held thereto by wheel pin nuts 138. Flanged wheel 139 is then mounted on wheel pin 137. Outer wheel brackets 133 and 134 are then set in place against their respective inner wheel brackets 122 and 123, wheel pins 137 extending through holes 136 of said outer wheel brackets 133 and 134, and spacing blocks 131 and 132 bearing against inner wheel brackets 122 and 123. Wheel pin nut 138 is then threaded to each wheel pin 137, thus securing said wheel pin 137 to outer wheel brackets 133 and 134. Bolts 140 are passed through holes 135 of outer wheel brackets 133 and 134 and of spacing blocks 131 and 132, and through holes 124 of inner wheel brackets 122 and 123, and are threaded into nuts 125. To insure a rigidly assembled wheel assembly 120, and, at the same time, to avoid interfering with wheel assembly 118 when hatch cover 1 is closed (FIGURE 28), bolt 141 is passed through hole 142 in outer wheel bracket 134, through spacer 143, and is threaded into hole 144 of inner wheel bracket 123. Bolt 141 can be prevented from backing out by tack welding it to the outboard face of outer wheel bracket 134. Wheel pin 137 is fitted with hole 144a to accommodate a grease fitting, thus insuring proper lubrication.

Rails 119 and 121 are fastened, as by welding, to rider plate 29, and run parallel to those sides of hatch cover 1 and hatch opening 2 perpendicular to hatch end 11. Rail 119 serves section 4 of hatch cover 1, and rail 121 serves section 5 thereof. Stop plate 145 is fastened, as by welding, to rider plate 29 and rail 119, near the hatch end 11, and has an arcuate surface 146 which engages the tread of wheel 139 when panels 7 and 8 are parallel to each other, thus preventing said panels 7 and 8 from colliding with each other in the process of opening hatch opening 2. Stop plate 147 is fastened in like manner to rider plate 29 and rail 121, near hatch end 11, and has an arcuate surface 146 which engages the tread of wheel 139 when panels 9 and 10 are parallel to each other.

Rails 119 and 121 each terminate just before parting joint 6. Ramp 149, with ear 150 is pivotally mounted to the end of rail 119 by means of pin 152 passing through ramp pad 153, and ear 150, and threaded into hole 156 of ear 157 formed at the end of rail 119. In like manner, ramp 158, with ear 159 is pivotally mounted to the end of rail 121 by means of pin 161 passing through ramp pad 162, and ear 159, and threaded into hole 165 of ear 166 formed at the end of rail 121. Ramps 149 and 158 are slightly concave at 167.

The outboard vertical leg of coaming channel 27 is coped out below parting joint 6 (FIGURE 34), and insert plate 168 is fitted and fastened thereto as by welding. Pad 169 is fastened to insert plate 168 and coaming channel 27, as by welding. Hole 170 is formed through insert plate 168 and pad 169, directly below parting joint 6. Trapezoidally shaped slots 171 and 172 are formed through rider plate 29 and coaming channel 27 directly below ramps 149 and 158 respectively. Inboard of slot 171, shaft pad 173 is fastened to the bottom of the web of coaming channel 27, as by welding. Hole 174, in axial alignment with hole 170, is formed through shaft pad 173. Between slots 171 and 172, shaft pad 175 is fastened to the bottom of the web of coaming channel 27, as by welding. Hole 176, in axial alignment with holes 170 and 174, is formed through shaft pad 175. Outer shaft 177 with core hole 178 formed therein, is passed through hole 170 and bushing 179 in insert plate 168 and pad 169, through hole 180 in cam 181 working in slot 172, and through hole 176 and bushing 182 in shaft pad 175. Cam 181 is then fastened, as by welding, to outer shaft 177. The inboard end of outer shaft 177 is threaded and receives lock nut 184. The outboard end of outer shaft 177 is threaded and receives hexagonally shaped hub 186. Hub 186 is tack welded to outer shaft 177. Bushing 188 is fitted to core hole 178 in outer shaft 177. Inner shaft 189 is inserted through bushing 188 and core hole 178 of outer shaft 177, passes through hole 190 of cam 191 working in slot 171, and through bushing 192 in hole 174 of shaft pad 173. Cam 191 is then fastened, as by welding, to inner shaft 189. The inboard end of inner shaft 189 is threaded, as at 193, and receives washer 194 and nut 195. The outboard end of inner shaft 189 is threaded, and receives hexagonally shaped hub 197. Hub 197 is tack welded to inner shaft 189. The distance across flats of hub 197 is less than that of hub 186. Bar 200 is passed through hole 201 in shaft pad 173, and is fastened, as by welding, to shaft pad 173 and to the inside of insert plate 168. Cams 181 and 191 can be individually rotated by turning hubs 186 and 197 respectively, by means of a conventional wrench. Preferably, wrench 202, with hexagonal holes 203 for hub 186 and 204 for hub 197, is used.

Figures 30, 31, 33A, 33B, 34, 35:
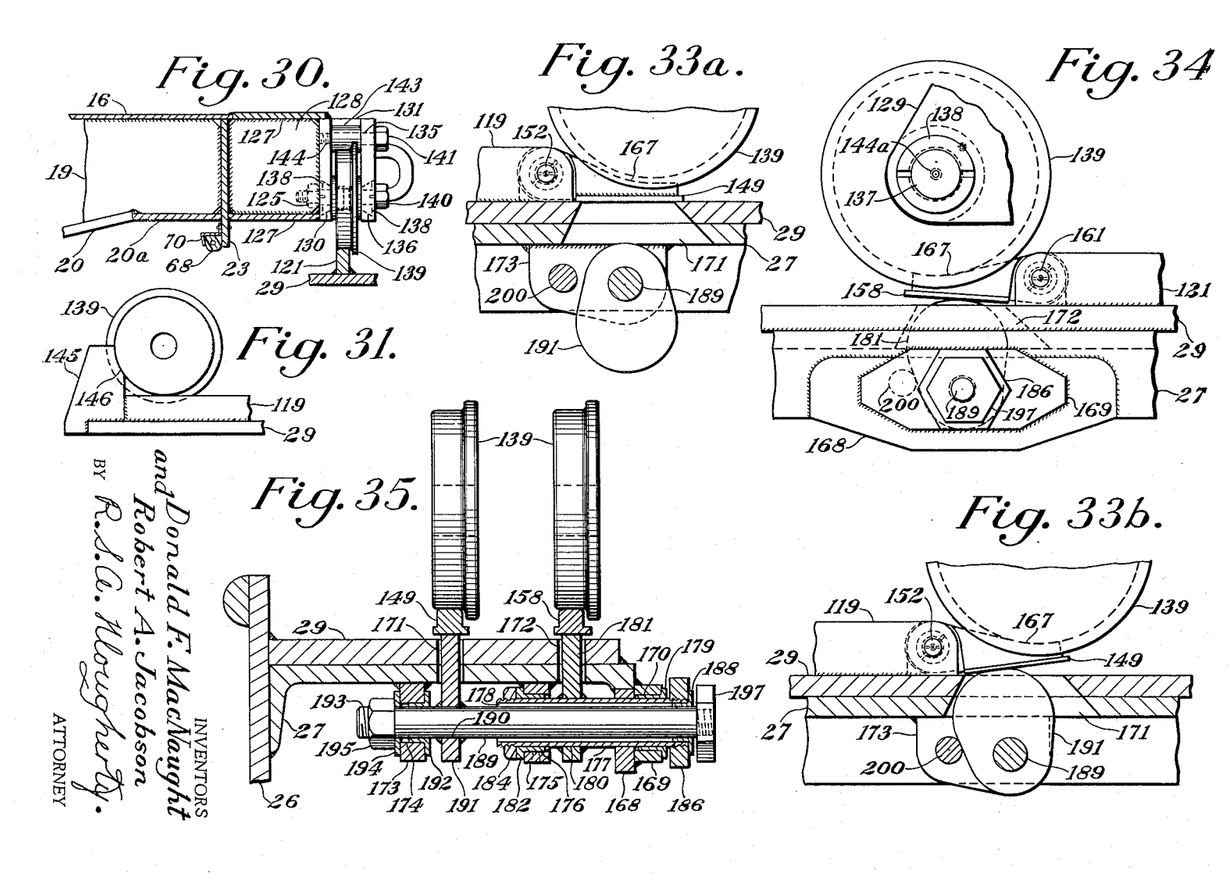
FIGURE 30 represents a section in elevation of the outboard wheel assembly, taken along the line 30—30 of FIGURE 28.
FIGURE 31 represents a view in elevation of the stop plate located at the ends of the rails.
FIGURE 33a represents a section in elevation of the inboard ramp and the cam-operated means associated therewith, taken along the line 33—33 of FIGURE 32, showing the ramp in its fully lowered position.
FIGURE 33b represents a section in elevation of the inboard ramp and the cam-operated means associated therewith, taken along the line 33—33 of FIGURE 32, showing the ramp in its fully raised position.
FIGURE 34 represents a view in elevation of the outboard ramp and the cam-operated means associated therewith, taken along the line 34—34 of FIGURE 32, showing the ramp in its fully raised position.
FIGURE 35 represents a section in elevation of the ramps and the cam-operated means associated therewith, taken along the line 35—35 of FIGURE 32, showing the ramps in their fully raised position.

When sections 4 and 5 of hatch cover 1 are fully extended, in closing hatch opening 2, wheels 139 will drop said sections 4 and 5 to gasket contact with gasket seat plates 28 and rider plates 29. To provide for the vertical displacement of wheels 139 which would result from dogging down sections 4 and 5, ramps 149 and 158 are lowered by rotating hubs 197 and 186 respectively until the extreme ends of said ramps 149 and 158 rest on rider plate 29 just beyond slots 171 and 172 respectively (FIGURE 33a). When it is desired to open hatch opening 2, after undogging hatch cover 1, ramps 149 and 158 are raised to contact wheels 139, by rotating hubs 197 and 186 respectively (FIGURE 33b). Sections 4 and 5 may then be rolled on wheels 139 up ramps 149 and 158 respectively to rails 119 and 121 respectively.

Support chocks 205 (FIGURE 16) are spaced along parting joint 6, mounted alternately to panels 8 and 9, and comprise pad 206 formed with vertical arm 207 and horizontal arm 208. Vertical arm 207 extends from the bottom of cover plate 16, to which it is fastened as by welding, through a slot in angle 24 and bar 83, to which it is also fastened as by welding. Horizontal arm 208 extends to a point under the horizontal leg of angle 24 of the panel 8 or 9 situated across parting joint 6 and carries bar 209 as shown in the drawings. When support chocks 205 are located directly adjacent to angles 18, the only stiffening required is that furnished by chock 210, which is fastened to angles 18 and 24. When support chocks 205 are located between angles 18, angle 211 is fastened to vertical arm 207 and to adjacent web plate 19, and angle 212 is fastened to angle 24 of the panel across parting joint 6. Bumper plate 210a is fastened to the underside of angle 24, adjacent to bar 83, at each location of support check 205. The function of the support chocks is to equalize the deflection of panels 8 and 9 so that the gasket contact at parting joint 6 will be maintained under varying conditions of loading of hatch cover 1. When the entire hatch cover 1 is in the closed position and dogged down, or not dogged down, and uniformly loaded across sections 4 and 5, or not loaded at all, support chocks 205 will carry no load. When the entire hatch cover 1 is dogged down and one section, for instance section 4, is loaded, and the other section, for instance section 5, carries a lesser load, section 4 will deflect independently of section 5 until those support chocks 205 secured to section 5 contact, through bars 209, those bumper plates 210a and bars 83 secured to section 4. Then sections 4 and 5 will deflect as a unit, thus maintaining gasket contact at parting joint 6. Clearance is provided between bar 209 and the horizontal leg of angle 24, preferably ¼" minimum for the entire arc of operation of support chocks 205 as the sections 4 and 5 are extended into position, so that one section, for instance section 4, of hatch cover 1 may be opened or closed while the other section, for instance section 5, is closed and dogged down to ¼" gasket compression.

Trough 213 is fastened to cover plate 16 of panel 8, and extends the full length of parting joint 6.

Staples 214 are mounted to outer wheel brackets 133 and 134 and permit the fastening of a line thereto to implement operation of the covers.

Figures 26, 27:
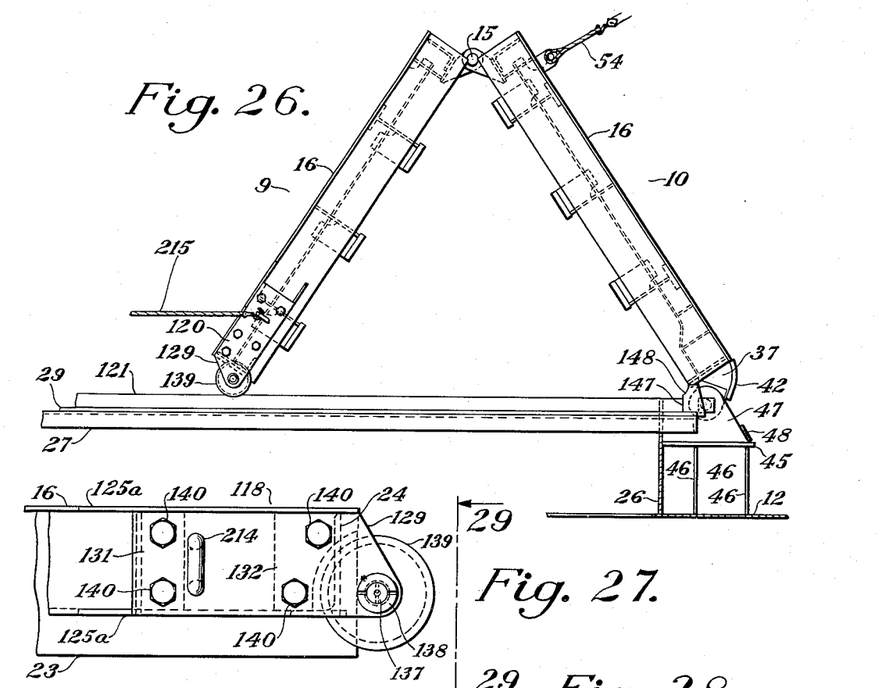
FIGURE 26 represents a view in elevation of one section of the hatch cover, showing the manner of closing.
FIGURE 27 represents a view in elevation of the inboard wheel assembly.

The operation of hatch cover 1 is largely apparent from the foregoing description. However, it may be briefly described as follows, with attention drawn to the fact that, although the description will refer to section 5, it applies as well to section 4, and that either section 4 or 5 may be opened or closed first. Assuming hatch opening 2 to be initially closed, dogging means 3 are released. Ramp 158 is raised. Line 54 of cargo whip is attached to lifting pad 59 and section 5 is opened slowly to the vertical position, and secured. When it is desired to close hatch opening 2, line 54 is attached to lifting pad 59. Lines 215 are fastened to staples 214 (FIGURE 26). Tension is applied to lines 215 until section 5 starts to roll from its vertical position, while line 54 is payed out to regulate speed of closing. Thus, section 5 is slowly closed. Then ramp 158 is lowered. Section 5 is dogged down by dogging means 3, starting with those dogging means 3 located adjacent the center of hatch end 11 and then working in sequence outward in both directions along hatch end 11, and then along the longitudinal sides of section 5 until parting joint 6 is reached.

Figures 32, 36, 37, 38:
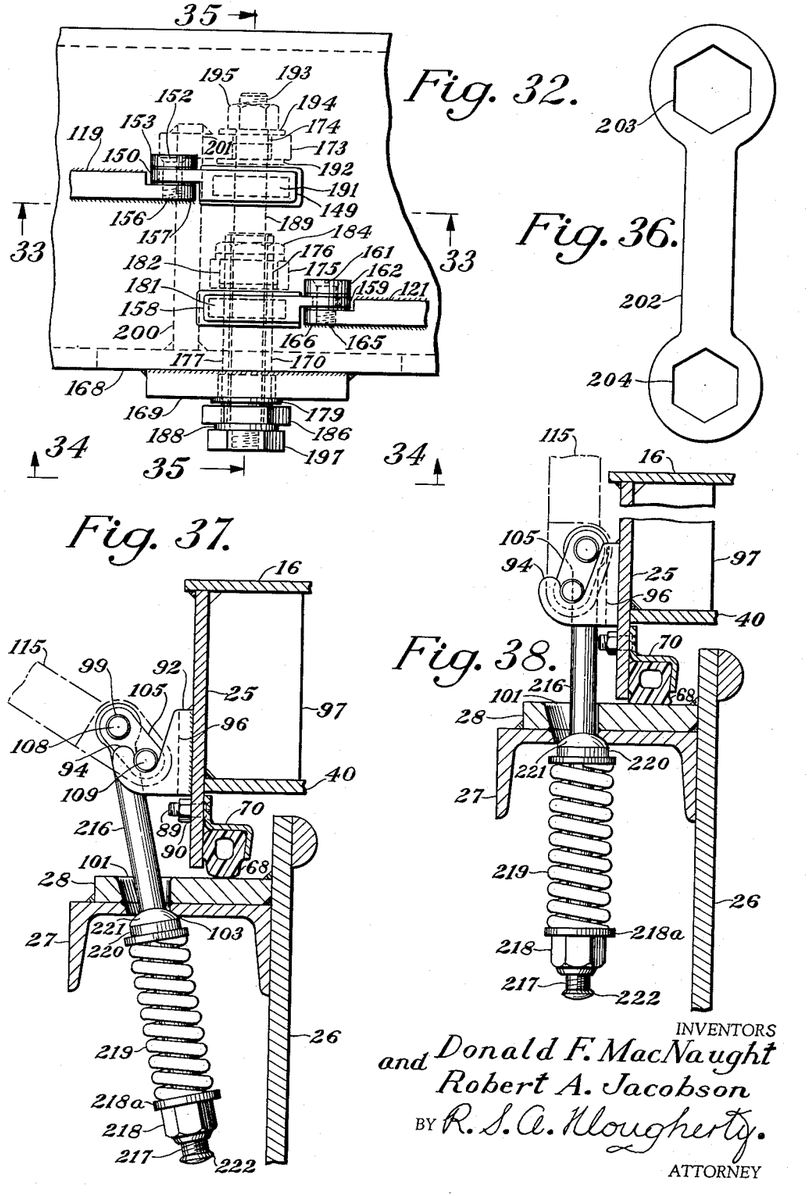
FIGURE 32 represents a view in plan of the ramps and the cam-operated means for raising or lowering said ramps.
FIGURE 36 represents a view of the wrench used to operate the cams in raising or lowering the ramps.
FIGURE 37 represents a view in elevation of the modified dogging means, showing the dog link as it is brought over the arms of the dog pad.
FIGURE 38 represents another view in elevation of the modified dogging means, showing the dog link locked in position against the arms of the dog pad, with the gasket fully compressed.

This invention can be modified with respect to dogging means 3, in substituting dog bolt 216 (FIGURE 37) for dog bolt 98. Dog bolt 216 has eye 99 formed at the upper end, and is situated in slot 101 formed through coaming channel 27 and gasket seat plate 27 or rider plate 29. Dog bolt 216 is threaded at its lower end, as at 217, and nut 218 is threaded thereon holding washer 218a and maintaining pressure on spring 219 which, in turn, forces cap 220 having convex bearing surface 221 against concave bearing surface 103 of slot 101. After dog bolt 216 is assembled with cap 220, spring 219, nut 218, and washer 218a, the lower end of the dog bolt 216 is peened, as at 222. Modified dogging means 3 is operated as before, using the same dog link 105, dog pad 92, and dog lever 115. The use of spring 219 in dogging means 3 has the effect of insuring uniform gasket compression and uniform bolt stress.

Although we have shown and described our invention in considerable detail, we do not wish to be limited to the exact construction shown and described, but may use such substitutions, modifications or equivalents thereof as are embraced within the scope of our invention, or as pointed out in the claims.

We claim:

1. In a hatch cover of the type wherein two sections, meeting at a parting line, are each provided with a wheel adapted to roll on a rail, the rail serving one section being outboard of and parallel to the rail serving the other section, and each of said rails terminating near the parting line in a pivotally mounted ramp, a ramp positioner comprising a hollow outer shaft rotatably mounted below said outboard ramp substantially perpendicular to said rails and terminating between said ramps, a first cam mounted to said outer shaft in engageable relationship with the bottom of said outboard ramp, a rotatably mounted inner shaft positioned in said outer shaft and projecting below said inboard ramp, and a second cam mounted to said inner shaft below and in engageable relationship with the bottom of said inboard ramp, whereby said ramps may be individually positioned.

2. A ramp positioner as set forth in claim 1, including a bar mounted parallel to said outer shaft and adapted to engage and hold either one of said cams upright and in engagement with the ramp associated with said cam, when the latter is so positioned.

3. A hatch cover for the hatch opening of a vessel, comprising a pair of upwardly foldable cover sections each having a first edge and a second edge, means hingedly mounting the first edges of said cover sections to opposite ends of the hatch opening, said cover sections meeting when closed at a parting line extending along the second edges thereof, an arm secured to each cover section adjacent to the second edge thereof and extending beneath in closely spaced relationship to the bottom of the other cover section, and means for folding and unfolding each cover section independently of the other cover section.

4. A hatch cover for the hatch opening of a vessel, comprising a pair of upwardly foldable cover sections each having a first edge and a second edge, means hingedly mounting the first edges of said cover sections to opposite ends of the hatch opening, said cover sections meeting when closed at a parting line extending along the second edges thereof, an arm secured to each cover section adjacent to the second edge thereof and extending beneath in closely spaced relationship to the bottom of the other cover section, a gasket on the second edge of each cover section and engaging the gasket on the other cover section solely along a vertical plane, and means for folding and unfolding each cover section independently of the other cover section.

5. A hatch cover for the hatch opening of a vessel, comprising a pair of upwardly foldable cover sections each having a first edge and a second edge, means hingedly mounting the first edges of said cover sections to opposite ends of the hatch opening, said cover sections meeting when closed at a parting line extending along the second edges thereof, an arm secured to each cover section adjacent to the second edge thereof and extending beneath in closely spaced relationship to the bottom of the other cover section, wheels mounted on each cover section adjacent the second edge thereof, tracks for said wheels, ramps for said wheels located adjacent said parting line and underlying said wheels when said cover sections are unfolded across the hatch opening, means for lowering and raising the ramps for the wheels of each cover section independently of the ramps for the wheels of the other cover section, and means for folding and unfolding each cover section independently of the other cover section.

6. A hatch cover for the hatch opening of a vessel, comprising a pair of upwardly foldable cover sections each having a first edge and a second edge, means hingedly mounting the first edges of said cover sections to opposite ends of the hatch opening, said cover sections meeting when closed at a parting line extending along the second edges thereof, an arm secured to each cover section adjacent to the second edge thereof and extending beneath in closely spaced relationship to the bottom of the other cover section, wheels mounted on each cover section adjacent the second edge thereof, tracks for said wheels, ramps for said wheels located adjacent said parting line and underlying said wheels when said cover sections are unfolded across the hatch opening, means for lowering and raising the ramps for the wheels of each cover section independently of the ramps for the wheels of the other cover section, a gasket on the second edge of each cover section and engaging the gasket on the other cover section solely along a vertical plane, and means for folding and unfolding each cover section independently of the other cover section.

7. A hatch cover for the hatch opening of a vessel, comprising a pair of upwardly foldable cover sections each having a first edge and a second edge, means hingedly mounting the first edges of said cover sections to opposite ends of the hatch opening, said cover sections meeting when closed at a parting line extending along the second edges thereof, an arm secured to each cover section adjacent to the second edge thereof and extending beneath in closely spaced relationship to the bottom of the other cover section, gasket means interposed between the second edges of said cover sections and operative solely along a vertical plane to seal the parting line when said cover sections are unfolded, and means for folding and unfolding each cover section independently of the other cover section.

8. A hatch cover for the hatch opening of a vessel, comprising a pair of upwardly foldable cover sections each having a first edge and a second edge, means hingedly mounting the first edges of said cover sections to opposite ends of the hatch opening, said cover sections meeting when closed at a parting line extending along the second edges thereof, a gasket on the second edge of each cover section and engaging the gasket on the other cover section solely along a vertical plane, dogging means for selectively dogging either or both cover sections in closed position across the hatch opening or undogging either or both said cover sections, whereby each cover section may be folded and unfolded independently of the other cover section over a range from closed dogged position to open undogged position.

9. A hatch cover for the hatch opening of a vessel, comprising a pair of upwardly foldable cover sections each having a first edge and a second edge, means hingedly mounting the first edges of said cover sections to opposite ends of the hatch opening, said cover sections meeting when closed at a parting line extending along the second edges thereof, wheels mounted on each cover section adjacent the second edge thereof, tracks for said wheels, ramps for said wheels located adjacent said parting line and underlying said wheels when said cover sections are unfolded across the hatch opening, means for lowering and raising the ramps for the wheels of each cover section independently of the ramps for the wheels of the other cover section, dogging means for selectively dogging either or both cover sections in closed position across the hatch opening or undogging either or both said cover sections, whereby each cover section may be folded and unfolded independently of the other cover section over a range from closed dogged position to open undogged position.

10. A hatch cover for the hatch opening of a vessel, comprising a pair of upwardly foldable cover sections each having a first edge and a second edge, means hingedly mounting the first edges of said cover sections to opposite ends of the hatch opening, said cover sections meeting when closed at a parting line extending along the second edges thereof, wheels mounted on each cover section adjacent the second edge thereof, tracks for said wheels, ramps for said wheels located adjacent said parting line and underlying said wheels when said cover sections are unfolded across the hatch opening, means for lowering and raising the ramps for the wheels of each cover section independently of the ramps for the wheels of the other cover section, a gasket on the second edge of each cover section and engaging the gasket on the other cover section solely along a vertical plane, dogging means for selectively dogging either or both cover sections in closed position across the hatch opening or undogging either or both said cover sections, whereby each cover section may be folded and unfolded independently of the other cover section over a range from closed dogged position to open undogged position.

References Cited in the file of this patent

UNITED STATES PATENTS

| | | |
|---|---|---|
| 1,158,946 | McGray | Nov. 2, 1915 |
| 1,768,701 | MacGregor | July 1, 1930 |
| 1,964,203 | Isherwood et al. | June 26, 1934 |
| 2,012,885 | Lovatt | Aug. 27, 1936 |
| 2,121,386 | Henrickson | June 21, 1938 |
| 2,129,973 | Tutin | Sept. 13, 1938 |
| 2,381,030 | Blackburn | Aug. 7, 1945 |
| 2,447,906 | Groppell | Aug. 24, 1948 |
| 2,564,051 | Bush | Aug. 14, 1951 |
| 2,583,053 | Kestner et al. | Jan. 22, 1952 |
| 2,674,967 | Bich et al. | Apr. 13, 1954 |
| 2,697,998 | Jernstrom | Dec. 28, 1954 |
| 2,707,928 | Farrell | May 10, 1955 |
| 2,726,623 | Jernstrom | Dec. 13, 1955 |
| 2,799,238 | Suderow | July 16, 1957 |

FOREIGN PATENTS

| | | |
|---|---|---|
| 1,022,796 | France | Dec. 17, 1952 |